United States Patent [19]

Bilotti

[11] Patent Number: 5,354,031
[45] Date of Patent: Oct. 11, 1994

[54] LOW-PROFILE UMBRELLA BASE

[75] Inventor: Alfred J. Bilotti, Huntington Beach, Calif.

[73] Assignee: Dayva International, Inc., Huntington Beach, Calif.

[21] Appl. No.: 38,708

[22] Filed: Mar. 29, 1993

[51] Int. Cl.5 .............................. F16M 13/00
[52] U.S. Cl. .................... 248/519; 248/511; 248/910
[58] Field of Search .......... 248/519, 523, 910, 159, 248/188.1, 529, 511; 135/98

[56] References Cited

U.S. PATENT DOCUMENTS

| 3,119,588 | 1/1964 | Keats | 248/910 X |
|---|---|---|---|
| 4,145,044 | 3/1979 | Wilson et al. | 248/910 X |
| 4,201,975 | 5/1980 | Marcus | 248/519 X |
| 4,232,846 | 11/1980 | Bressani | 248/910 X |
| 4,591,126 | 5/1986 | Berney | 248/910 X |
| 4,793,611 | 12/1988 | Thornell | 248/910 X |
| 5,169,111 | 12/1992 | Dunaj | 248/523 |
| 5,178,356 | 1/1993 | Schouwey | 248/519 |

FOREIGN PATENT DOCUMENTS 408304 9/1966 Switzerland ............ 248/519

Primary Examiner—Ramon O. Ramirez
Assistant Examiner—Derek J. Berger
Attorney, Agent, or Firm—Raymond Sun

[57] ABSTRACT

An umbrella base comprises a base portion and a neck portion. The base portion has a disc with an upturned annular collar communicating with and extending from the top surface of the disc. The disc and the collar have hollow interiors filled with cement or sand, and has a central bore provided therethrough for receiving the neck of the neck portion. The neck portion further comprises a core coupled to the neck, with a bore provided through the neck and the core for receiving and holding the shaft of an umbrella.

11 Claims, 3 Drawing Sheets

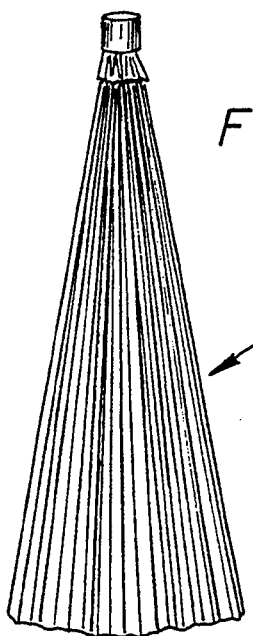
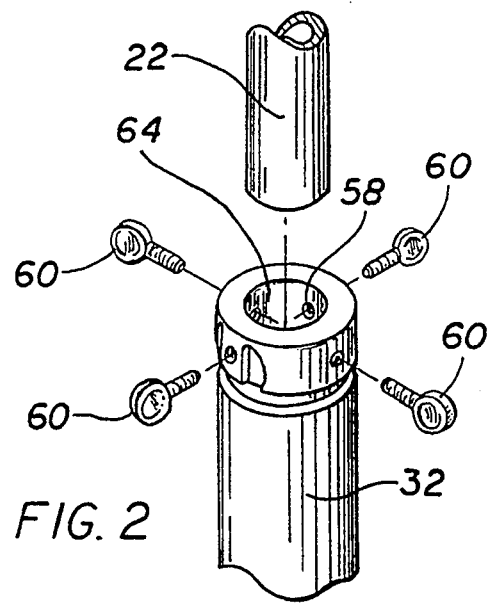
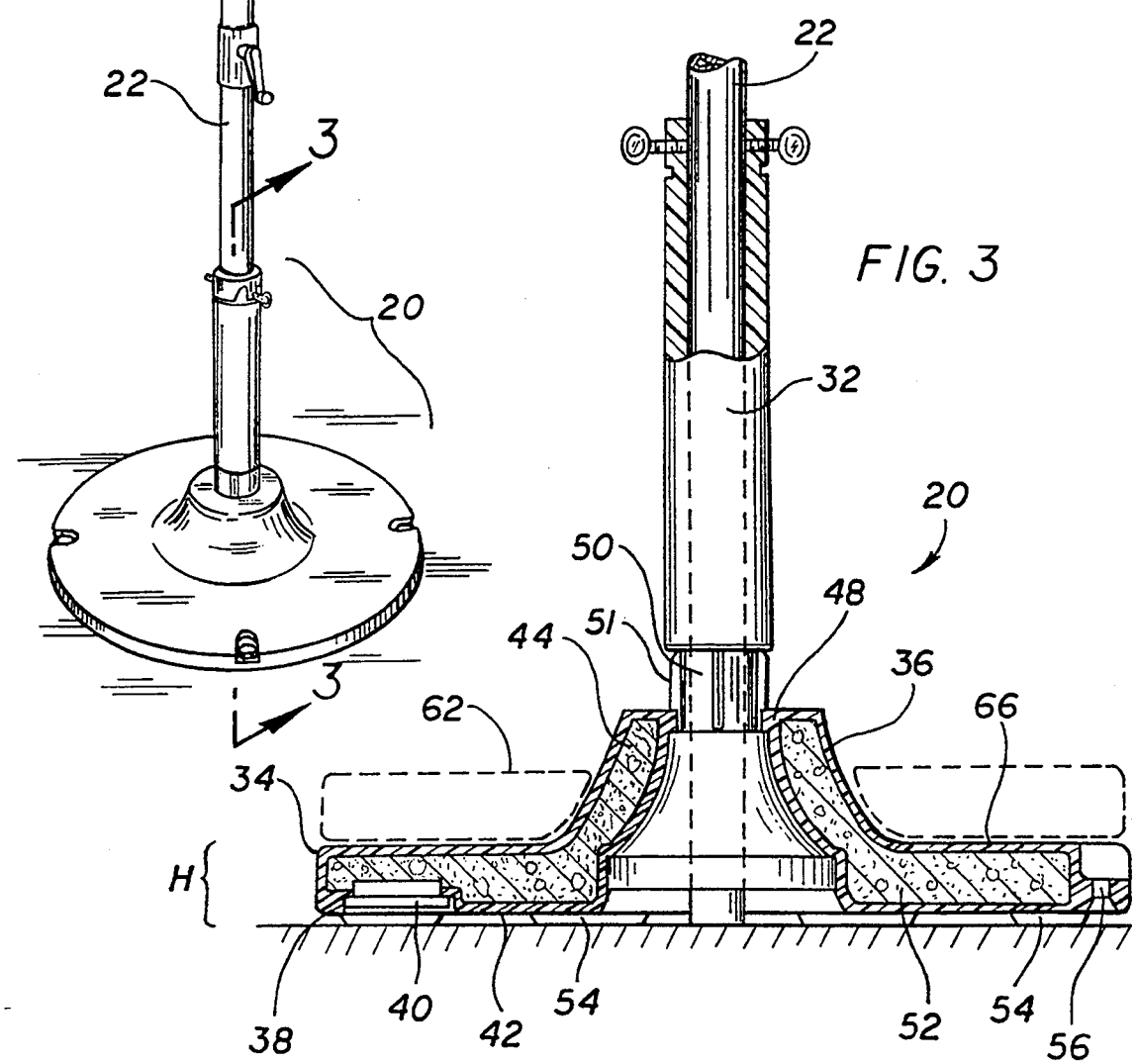

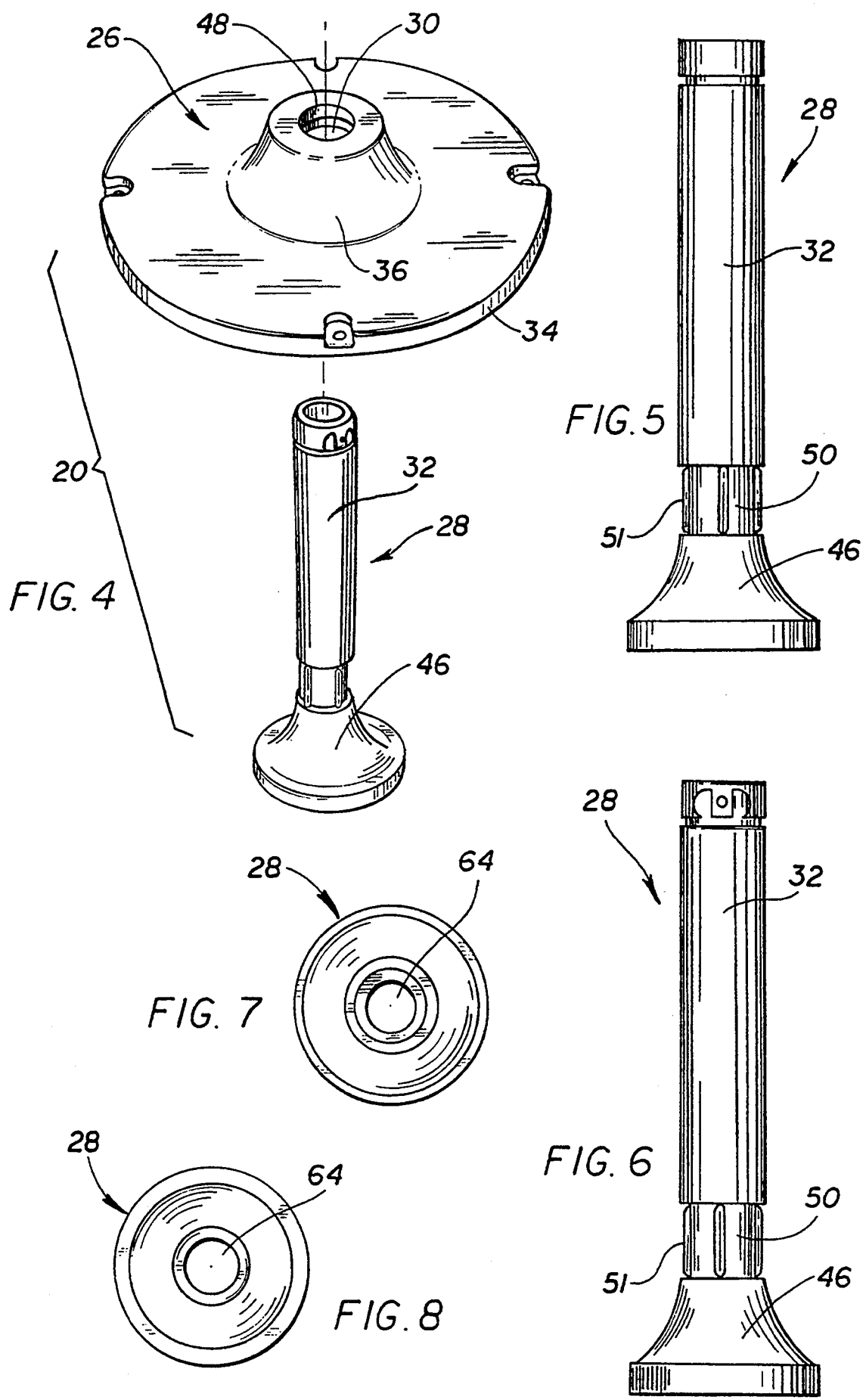

LOW-PROFILE UMBRELLA BASE

BACKGROUND OF THE INVENTION

1. Field Of The Invention

The present invention relates to a low profile, high neck umbrella base which is capable of stably holding and supporting heavy and large diameter umbrellas.

2. Description Of The Related Art

Garden and patio umbrellas are very popular for use in one's home yard and patios and in restaurant patios. These garden umbrellas are usually quite large, spanning wide enough to cover a garden or patio table and its accompanying chairs to provide sufficient shade from the sunlight. The large size of these umbrellas generally means that these umbrellas are quite heavy. The large size and heavy weight of these umbrellas also require a strong and stable base to support them.

There are currently a number of umbrella bases that are available. Bases made from steel are very popular because steel is solid and heavy enough to provide a strong support to the umbrella, and can be made with an aesthetically pleasing low profile. However, steel is a generally more expensive material than the other alternatives and steel bases tend to rust after being exposed to harsh weather. Further, many of these steel bases have a relatively low neck which does not facilitate effective support for large umbrellas having long shafts.

Other umbrella bases are made by molding a hollow base from plastic and filling the hollow base with sufficient cement or sand to provide a stable support. Such an umbrella base does not rust and is substantially less expensive to manufacture as compared to a steel base. The sand can also be removed and refilled to facilitate convenient transportation or movement. However, most of these cement-filled plastic umbrella bases do not have the streamlined low-profile appearance of steel bases, but instead are high-domed, have a low neck, and have a clumsy, bulky and aesthetically distasteful appearance. For example, most of these bases have height of at least 8 inches with the neck being about 4–5 inches.

Thus, there is a need for an umbrella base that is inexpensive to manufacture, is solid and heavy enough to stably support a large and heavy umbrella, has a streamlined and low profile appearance, has a long upright neck to effectively support large umbrellas with long shafts, is capable of resisting harsh weather, and is convenient to transport and to use.

SUMMARY OF THE INVENTION

The objects of the present invention may be achieved by providing an umbrella base having a base portion and a neck portion. The base portion has a plastic disc with an upturned annular collar communicating with and extending from the top surface of the disc. The disc and the collar have hollow interiors filled with cement or sand, and has a central bore provided therethrough for receiving the neck of the neck portion. The neck portion comprises a core coupled to the neck, with a bore provided through the neck and the core for receiving and holding the shaft of an umbrella. Holes are provided at the top of the neck for allowing thumb screws to be screwed therethrough to secure the shaft of the umbrella within the bore. The disc has a very streamlined and low profile, with a height of less than 3 inches.

The umbrella base according to the present invention also has ribs provided on an annular groove formed on the outer surface of the neck portion for engaging an annular flange formed along the circumference of the collar to secure the neck portion to the base portion. The lower portion of the central bore has a domed-shaped configuration, and the core of the neck portion has an upwardly curved configuration adapted to snugly fit the dome-shaped configuration of the lower portion of the central bore. The bottom surface of the disc is provided with an opening through which the user can fill the interior of the disc and the collar with cement or sand.

The umbrella base according to the present invention provides an umbrella base which is inexpensive to manufacture. The weight distribution of the base portion and long neck allows the umbrella base to provide a strong support for the umbrella, yet allows the umbrella base to assume an aesthetically pleasing streamlined and low profile that appears like steel even though it is made of sand-filled plastic. The plastic-molded base is effective in resisting the harsh outdoor weather and is therefore durable. The sand may be removed and refilled according to the user's wishes and is therefore convenient to use and transport.

BRIEF DESCRIPTION OF THE DRAWINGS

FIG. 1 is a perspective view of an umbrella base in accordance with an exemplary embodiment of the present invention shown holding and supporting a garden umbrella;

FIG. 2 is an exploded perspective view showing how the shaft of an umbrella is secured within the neck of the umbrella base of FIG. 1;

FIG. 3 is a cross-sectional view of the umbrella base of FIG. 1 taken along lines 3—3 thereof;

FIG. 4 is an exploded perspective view of the umbrella base of FIG. 1 showing how the neck may be fitted through the base portion;

FIG. 5 is front elevational view of the neck portion of the umbrella base of FIG. 4;

FIG. 6 is side elevational view of the neck portion of the umbrella base of FIG. 4;

FIG. 7 is a top plan view of the neck portion of the umbrella base of FIG. 4;

FIG. 8 is a bottom plan view of the neck portion of the umbrella base of FIG. 4;

DESCRIPTION OF THE PREFERRED EMBODIMENTS

Figure 9:
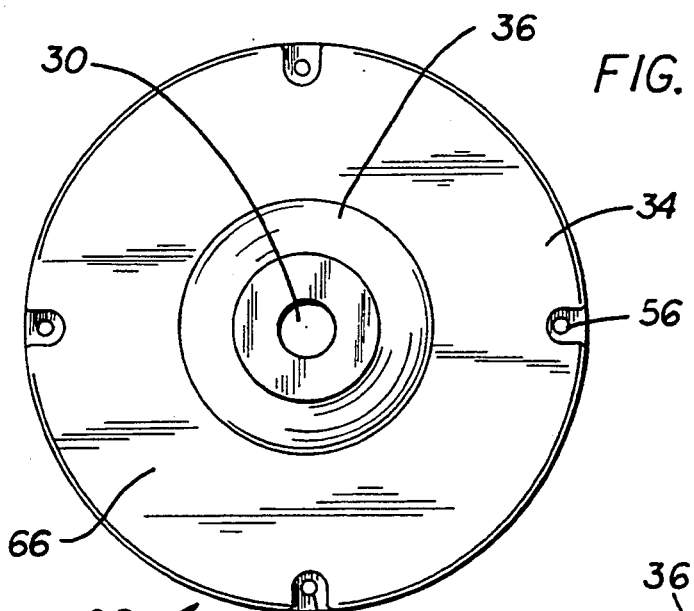
FIG. 9 is a top plan view of the base portion of the umbrella base of FIG. 4.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The umbrella base 20 in accordance with a preferred embodiment of the present invention is shown in FIG. 1 holding and supporting the shaft 22 of a garden umbrella 24. Referring to FIGS. 3 and 4, the umbrella base 20 comprises a base portion 26 and a neck portion 28. The base portion 26 is provided with a central bore 30 adapted to allow the neck 32 of the neck portion 28 to be fitted therethrough.

Figure 10:
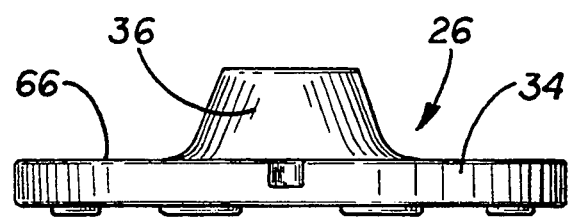
FIG. 10 is a side elevational view of the base portion of the umbrella base of FIG. 4.
Figure 11:
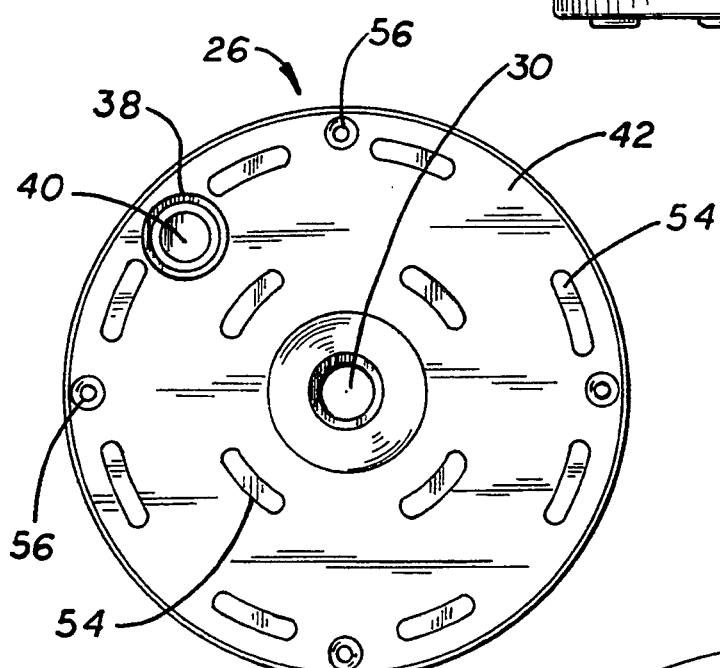
FIG. 11 is a bottom plan view of the base portion of the umbrella base of FIG. 4.
Figure 12:
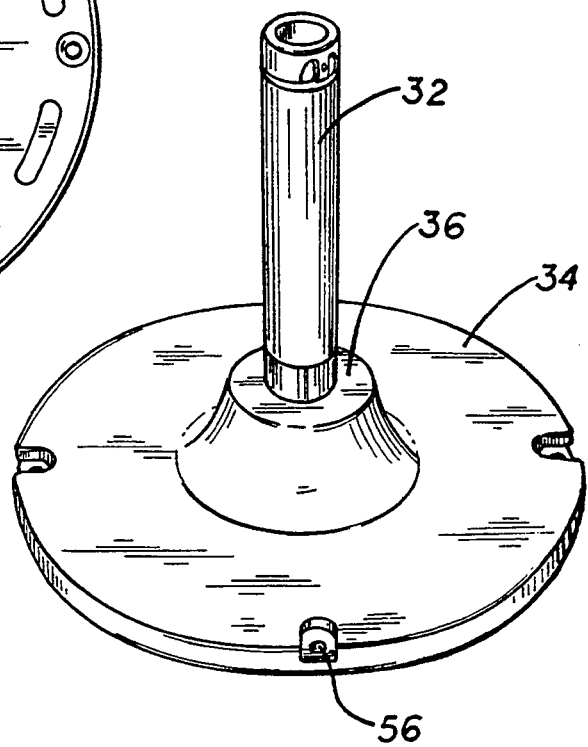
FIG. 12 is a perspective view of the umbrella base of FIG. 1 showing the neck portion and the base portion combined.

Referring to FIGS. 3, 4, 9, 10 and 11, the base portion 26 comprises a disc 34 with an integral upturned annular collar 36 at the central portion thereof and with the central bore 30 provided therethrough. A soft annular flange 48 made preferably from the same material as the collar 36 extends from the top of the collar 36 along its circumference. The disc 34 preferably has a uniform height H of less than 3 inches and is preferably about 1.5 inches.

Referring in particular to FIG. 3, the disc 34 and the collar 36 are preferably configured so that the bore 30 has a dome-shaped configuration with a wider diameter at the bottom and a narrower diameter at the top. Specifically, as shown in FIG. 3, the diameter of the bore 30 is widest at the portion of the disc 34, and gradually decreases in the upward direction along the collar 34 from the top surface 66 of the disc 34 to a diameter that is smallest at the circumference of the collar 36. This gradual decrease in diameter is accomplished by providing the bore 30 with a concave configuration which extends inwardly towards the center of the bore 30, thereby creating a dome-like configuration. The interior 44 of the base portion 26 is hollow and the base portion 26 is preferably blow-molded from plastic, although other low-cost materials such as fiberglass or aluminium may also be used. An opening 38 communicating with the hollow interior 44 of the base portion 26 is provided at the bottom 42 thereof to allow the user to fill the hollow interior 44 with a heavy material such as, for example, cement or sand. A seal or plug 40 may be used to seal the opening 38.

Referring to FIGS. 3-8, the neck portion 28 comprises a neck 32 terminating in an integral core 46 at the bottom thereof. A bore 64 is provided through the neck 32 and the core 46 to allow the shaft 22 of the umbrella 24 to pass therethrough (see FIG. 3). The bore 64 is cylindrical along the neck 32 and has a diameter adapted to allow the shaft 22 to slide through yet facilitates a snug and tight fit with the shaft 22. The diameter of the bore 64 in the core 46 increases from the top of the core 46 to the bottom of the core 46, following the domed shape of the central bore 30. The neck portion 28 is preferably made from strong thick plastic, but may also be made from fiberglass, aluminium or steel.

To install the base portion 26 to the neck portion 28, the neck 32 of the neck portion 28 is slid through the central bore 30 of the base portion 26 from the bottom 42. The sliding of the neck 32 forces the soft annular flange 48 to flex upwards, until the flange 48 engages an annular groove 50 provided between the neck 32 and the core 46. Ribs 51 are provided in the groove 50 to allow the flange 48 to tightly engage the neck 32 and to minimize a loose fit which may allow the neck 32 to slide or rotate within the central bore 30. This engagement secures the neck portion 28 to the base portion 26. It will be appreciated by those skilled in the art that the ribs 51 can be omitted and instead the groove 50 may be made narrower for fitting the flange 48 therein. The core 46 is configured to allow it to fit snugly within the dome-shaped central bore 30, as shown in FIG. 3. Specifically, the outer surface of the core 46 has a curved configuration that is adapted to receive or be fitted to the concave configuration of the central bore 30.

To use the installed umbrella base 20, the user may first fill the interior 44 with either sand or cement 52 by filling the sand or cement 52 through the opening 38 and sealing the opening 38. The umbrella base 20 must carry sufficient weight to support the umbrella 24. Since plastic is a lightweight material, a predetermined amount of a heavy material such as cement, sand, rocks or gravel may be used to fill the hollow umbrella base 20 to provide the necessary weight. In this case, the preferred weight is approximately 35 pounds, although other weights such as 50 or 70 pounds may be used.

Referring to FIG. 3, the umbrella base 20 is then placed on the ground. The bottom 42 is provided with projections 54 which act as stands to support the bottom 42 on the ground. The base portion 26 is provided with anchor holes 56 through which screws (not shown) or other conventional means may be used to further secure the umbrella base 20 to the ground. Any number of projections 54 or anchor holes 56 may be provided without departing from the spirit and scope of the present invention.

Referring to FIGS. 2 and 3, the shaft 22 of the umbrella 24 is then inserted through the bore 64 of the neck portion 28 until its bottom end contacts the ground. Two holes 58 are provided on opposing sides of the neck 32 along its upper end through which two corresponding thumb screws 60 may be threaded to secure the shaft 22 within the bore 64. The neck 32 is made sufficiently lengthy to provide stable support for the shaft 22, and has a length of preferably about 17.5 inches.

Referring to FIG. 3, one or more weighted discs 62 may be provided to give the umbrella base 20 more weight. Each weighted disc 62 may be configured as shown in FIG. 3 to have the same streamlined and low profile appearance of the discs 34, and are preferably made from plastic and filled with sand or cement. The weighted discs 62 need not be provided with corresponding collars. Each weighted disc 62 is provided with a central opening having a diameter adapted to allow the disc 62 to be slipped over the neck 32 and placed on top of the disc 34 in a manner in which the neck 32 fits snugly within the central opening. The weighted discs 62 may be used to allow an existing umbrella base 20 to support a larger umbrella 24, or to provide better support against strong winds and harsh weather. The weighted discs 62 are not provided with anchor holes so as to increase the aesthetic appeal of the entire product.

The base portion 26 has a flat streamlined appearance and low profile. The diameter of the disc 34 may vary depending upon the size and weight of the umbrella 24 to be supported. The collar 36 holds the base portion 26 in a central vertical position and provides a center positioning for weighted discs 62 that do not have collars provided thereon.

Although the neck portion 28 and the base portion 26 are described in the present invention as being separate components, it will be appreciated by those skilled in the art that the neck portion 28 and the base portion 26 may be provided as a single integrated component without departing from the spirit and scope of the present invention.

The umbrella base 20 of the present invention therefore provides an umbrella base made of cement or sand-filled plastic which is inexpensive to manufacture. The configuration of the disc 34 and the collar 36 facilitates effective weight distribution, and together with the long neck 32, combine to allow the umbrella base 20 to provide a strong support for the umbrella 24, yet allows the umbrella base 20 to assume an aesthetically pleasing streamlined and low profile that appears like steel even though it is made of sand-filled plastic. The plastic material of the umbrella base 20 is effective in resisting the harsh outdoor weather and is therefore durable. The sand or cement may be removed and refilled according to the user's wishes thereby making the umbrella base 20 convenient to use, store and transport. The umbrella base 20 is made from recyclable material and is therefore environmentally appealing.

While the description above refers to particular embodiments of the present invention, it will be understood that many modifications may be made without departing from the spirit thereof.

What is claimed is:

1. An umbrella base, comprising:

a base portion comprising a disc having a top surface and a bottom surface, an upturned annular collar communicating with and extending from the top surface of the disc, and an annular flange extending along the circumference of the collar, the disc and the collar having hollow interiors filled with a heavy material, the base portion further comprising a central bore provided through the disc and the collar; and a neck portion comprising an outer surface and a neck, wherein the neck is adapted to be fitted through the central bore of the base portion, the neck portion further comprising an annular groove formed on the outer surface thereof, and a plurality of ribs formed in the annular groove for engaging the annular flange of the collar.

2. The umbrella base of claim 1, wherein the disc has a height of less than three inches.

3. The umbrella base of claim 1, further comprising an opening at the bottom surface of the disc for allowing the interior of the disc and the collar to be filled with a heavy material.

4. The umbrella base of claim 3, wherein the heavy material is cement.

5. The umbrella base of claim 3, wherein the heavy material is sand.

6. The umbrella base of claim 1, further comprising a plurality of projections for supporting the bottom surface of the disc on the ground.

7. The umbrella base of claim 6, further comprising means for securing the umbrella base to the ground.

8. The umbrella base of claim 1, wherein the disc is made of plastic.

9. The umbrella base of claim 1, wherein the neck portion further comprises means for securing the umbrella to the umbrella base.

10. The umbrella base of claim 1, wherein the central bore has a concave configuration having a diameter that is largest at the bottom surface of the disc and gradually decreases to a diameter that is smallest at the upper circumference of the collar.

11. The umbrella base of the claim 10, wherein the neck further comprises a core having a bottom surface and an upper portion, the core coupled to the neck at the upper portion of the core, the core having a curved configuration with a diameter that is largest at the bottom surface and gradually decreases to a diameter that is smallest at the upper portion thereof, wherein the core is adapted to the snugly fitted within the central bore of the base portion.

* * * * *